United States Patent
von Schleinitz

(10) Patent No.: US 11,713,398 B2
(45) Date of Patent: Aug. 1, 2023

(54) CORROSION PROTECTING LAYER SYSTEM, CORROSION PROTECTED BEARING COMPONENT AND METHOD FOR PROTECTING A BEARING COMPONENT AGAINST CORROSION

(71) Applicant: AKTIEBOLAGET SKF, Gothenburg (SE)

(72) Inventor: Thilo von Schleinitz, Schweinfurt (DE)

(73) Assignee: AKTIEBOLAGET SKF, Gothenburg (SE)

(*) Notice: Subject to any disclaimer, the term of this patent is extended or adjusted under 35 U.S.C. 154(b) by 172 days.

(21) Appl. No.: 15/124,863

(22) PCT Filed: Feb. 24, 2015

(86) PCT No.: PCT/EP2015/053809
§ 371 (c)(1),
(2) Date: Sep. 9, 2016

(87) PCT Pub. No.: WO2015/135745
PCT Pub. Date: Sep. 17, 2015

(65) Prior Publication Data
US 2017/0022369 A1    Jan. 26, 2017

(30) Foreign Application Priority Data
Mar. 10, 2014 (DE) .................. 10201404329.8

(51) Int. Cl.
*C09D 5/10* (2006.01)
*F16C 33/20* (2006.01)
(Continued)

(52) U.S. Cl.
CPC ........... *C09D 5/106* (2013.01); *C08G 18/307* (2013.01); *C08G 18/76* (2013.01); *C09D 175/04* (2013.01);
(Continued)

(58) Field of Classification Search
CPC ..... C09D 5/106; C09D 175/04; F16C 33/201; F16C 33/203
(Continued)

(56) References Cited

U.S. PATENT DOCUMENTS 4,971,841 A * 11/1990 Panush .................. B05D 5/068
427/407.1
5,147,927 A * 9/1992 Baghdachi ............. C08G 18/10
524/710

(Continued)

FOREIGN PATENT DOCUMENTS

DE    2855120 A1    7/1980
DE    302022 A9 * 12/1994
(Continued)

OTHER PUBLICATIONS

Machine_English_translation_DE102012212688_B3; Von Schleinitz, T.; Jan. 2, 2014; EPO; whole document.*

(Continued)

*Primary Examiner* — Tahseen Khan
(74) *Attorney, Agent, or Firm* — J-Tek Law PLLC; Scott T. Wakeman; Mark A. Ussai

(57) ABSTRACT

A corrosion-protecting layer system, e.g., for a bearing component used in a wind turbine, includes a base layer that contains polyurethane, zinc, and vinylphosphonic acid or silane. An intermediate layer is formed on the base layer and contains polyurethane and zinc. A top layer is formed on the intermediate layer and contains polyurethane and micaceous iron oxide. A sealing layer is formed on the top layer and contains polyurethane.

16 Claims, 1 Drawing Sheet

(51) Int. Cl.
  *C09D 175/04* (2006.01)
  *C08G 18/30* (2006.01)
  *C08G 18/76* (2006.01)
  *C08K 5/5317* (2006.01)
  *C08K 5/54* (2006.01)
  *C08K 3/11* (2018.01)
  *C08K 3/08* (2006.01)
  *C08K 3/22* (2006.01)

(52) U.S. Cl.
  CPC .......... *F16C 33/201* (2013.01); *F16C 33/203* (2013.01); *F16C 33/208* (2013.01); *C08G 2150/90* (2013.01); *C08K 3/08* (2013.01); *C08K 3/11* (2018.01); *C08K 3/22* (2013.01); *C08K 5/5317* (2013.01); *C08K 5/54* (2013.01); *C08K 2003/0893* (2013.01); *C08K 2003/2268* (2013.01); *F16C 2208/02* (2013.01); *F16C 2208/12* (2013.01); *F16C 2223/30* (2013.01); *F16C 2240/48* (2013.01); *F16C 2240/60* (2013.01); *F16C 2360/31* (2013.01)

(58) Field of Classification Search
  USPC ........................................................ 428/220
  See application file for complete search history.

(56) References Cited

U.S. PATENT DOCUMENTS

| | | | | |
|---|---|---|---|---|
| 5,908,895 | A | * | 6/1999 | Vogt-Birnbrich ........................... C08G 18/0823 427/372.2 |
| 6,512,033 | B1 | * | 1/2003 | Wu ........................ C08G 18/12 156/330 |
| 6,558,796 | B2 | * | 5/2003 | Huybrechts ........ C08G 59/4071 106/14.12 |
| 2004/0030088 | A1 | * | 2/2004 | Salter ..................... C08K 5/521 528/59 |
| 2004/0204559 | A1 | * | 10/2004 | Melchiors .......... C08G 18/6659 528/44 |
| 2007/0055038 | A1 | * | 3/2007 | Gimmnich ........... C08G 18/282 528/49 |
| 2009/0018302 | A1 | * | 1/2009 | Laas ................. C08G 18/7837 528/19 |
| 2009/0061239 | A1 | * | 3/2009 | Burckhardt ................. C09J 5/02 524/157 |
| 2009/0123742 | A1 | * | 5/2009 | Vandermeulen ...... C08F 226/06 428/339 |
| 2011/0082273 | A1 | * | 4/2011 | Laas ..................... C09D 175/02 560/336 |
| 2012/0135245 | A1 | * | 5/2012 | Richert .................... B05D 7/57 428/423.1 |
| 2013/0078456 | A1 | * | 3/2013 | Xu ........................ C09D 167/00 524/442 |
| 2013/0143034 | A1 | * | 6/2013 | Iijima .................... C09D 5/103 428/328 |

FOREIGN PATENT DOCUMENTS

| | | | |
|---|---|---|---|
| DE | 102004055450 A1 | 5/2006 | |
| DE | 102012212688 B3 * | 1/2014 | |
| DE | 102012212688 B3 | 1/2014 | |
| EP | 0832908 A1 * | 4/1998 | .......... C09D 175/04 |
| EP | 2145760 A1 | 1/2010 | |
| EP | 2189485 A1 | 5/2010 | |

OTHER PUBLICATIONS

Bittorf, H.; Decorative organic anticorrosion coating system prepn. useful on metal or concrete, using tar epoxide resin primerand reactive aliphatic polyurethane resin top coat contg., coloured and aluminium flake pigment, Nov. 1994, Derwent Abstracts; whole document (Year: 1994).*

* cited by examiner

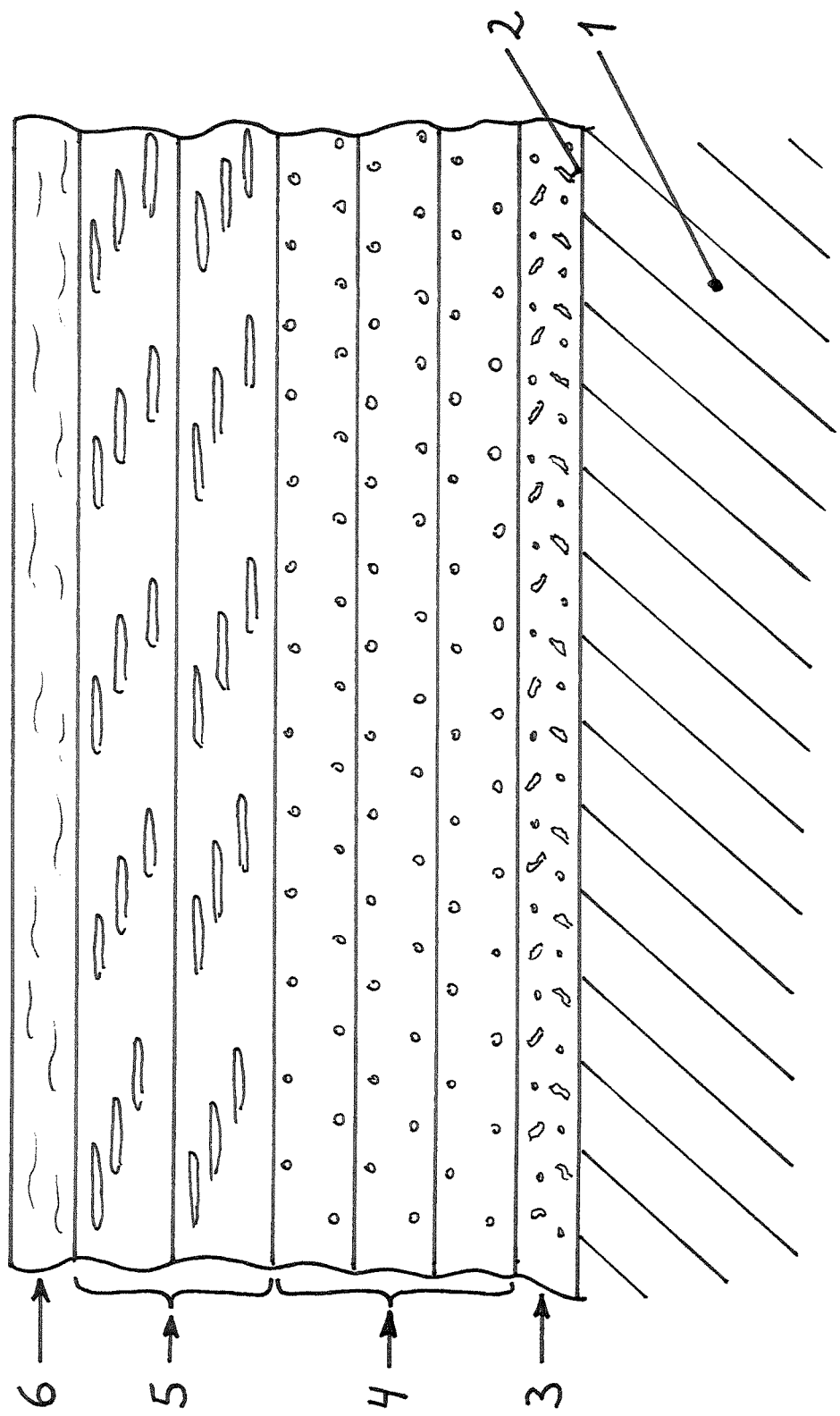

CORROSION PROTECTING LAYER SYSTEM, CORROSION PROTECTED BEARING COMPONENT AND METHOD FOR PROTECTING A BEARING COMPONENT AGAINST CORROSION

CROSS-REFERENCE

This application is the U.S. National Stage of International Application No. PCT/EP2015/053809 filed on Feb. 24, 2015, which claims priority to German patent application no. 10 2014 204 329.8 filed on Mar. 10, 2014.

TECHNICAL FIELD

The invention relates to a corrosion-protecting layer system and to a corrosion-protected bearing component. Furthermore, the invention relates to a method for protecting a bearing component against corrosion.

BACKGROUND ART

Bearings are sometimes exposed to corrosive environmental conditions. This is true, for example, for bearings that are installed in wind turbines and, for construction reasons or for cost reasons, are not installed in a housing, which, for example, protects against the effects of weather. Particularly problematic is the situation for wind turbines that are erected directly on the coast or even on the sea. In this case, the bearings can come into contact with highly corrosive salt water or with salt-water mist.

To protect against corrosion, the bearings can be provided with a coating. Varnishes based on epoxy resin are typically used as corrosion-protection coatings. Alternatively, a coating can be effected by thermal zinc spraying, i.e., zinc flame spraying or zinc plasma spraying.

In order to ensure a reliable corrosion protection, it is necessary that the coating firmly adheres to the substrate. For this purpose, a pre-conditioning of the substrate is typically a prerequisite. A known method for achieving a good adherence of a coating is to roughen the to-be-coated surface. In many cases the roughening is effected by a blasting treatment of the to-be-coated surface. For this purpose, abrasive particles, for example, corundum particles, are propelled against the to-be-coated surface. However, a blasting treatment of a bearing component entails the risk that residual abrasive particles will damage the bearing during operation, and/or a complete-as-possible removal of the abrasive particles from the bearing component is connected with a very high expense. Even a covering of the functional surfaces leads, upon removal of the covering, to recontamination, since loose particles accumulate everywhere. With zinc spraying as well, abrasive particles develop in the form of metal particles that are not bonded to the surface.

From DE102012212688B3, a method for the protection of a bearing component against corrosion is known that manages without a pretreatment of the to-be-protected surfaces by using abrasive particles. In the known method, a plurality of successive base layers of a first varnish based on polyurethane, to which zinc is added, are applied. A top layer of a second varnish based on polyurethane, to which micaceous iron oxide has been added, is applied to the last-applied base layer.

The method known from DE102012212688B3 offers a good corrosion protection and simultaneously avoids the risk, connected with the usage of abrasive particles, of later damage of the bearing.

SUMMARY

However, sometimes an even better corrosion protection is needed than is achievable with the known method. For example, for bearings of wind turbines in a maritime environment, a failure-free operation of up to 25 years is required in some instances.

The object of the invention is therefore to achieve a highly effective and economical corrosion protection, in particular for a bearing component, and to simultaneously avoid to the greatest possible extent that secondary damage is caused by the corrosion-protection treatment.

The corrosion-protecting layer system according to the invention includes a base layer, an intermediate layer, a top layer, and a sealing layer. The base layer contains polyurethane, zinc, and vinylphosphonic acid or silane. The intermediate layer is formed on the base layer and contains polyurethane and zinc. The top layer is formed on the intermediate layer and contains polyurethane and micaceous iron oxide. The sealing layer is formed on the top layer and contains polyurethane.

The invention has the advantage that it ensures a highly effective corrosion protection and is realizable with reasonable expense. Even under extremely corrosive environmental conditions, the inventive layer system offers reliable corrosion protection over a long period of time.

The base layer can in particular contain trimethoxysilane.

The base layer, the intermediate layer, the top layer, and the sealing layer can be formed identically with respect to their polyurethane base. Embrittlements that can arise due to the diffusion of varnish components into the respectively adjacent layer, and stresses that can lead to a lifting and spalling of layers, can thereby be avoided in a particularly reliable manner.

Furthermore, the base layer, the intermediate layer, the top layer, and the sealing layer can be formed differently from each other with respect to at least one ingredient.

The intermediate layer and/or the top layer can be formed from a plurality of partial layers. This has the advantage that the curing during the application of the intermediate layer or top layer is improved. In addition, the pore-penetrability is reduced and the internal stresses, which in the extreme case could lead to a delamination, are reduced. Furthermore, water vapor required for the crosslinking can more easily diffuse in and reaction by-products and gases can more easily diffuse out.

The sealing layer can include a content of pigments or other particles of at most 10 vol %. In particular, the sealing layer can be essentially comprised of polyurethane binding agent. Due to a lowest possible content of particles, the sealing layer can be formed particularly smooth and has a high diffusion-impermeability.

Furthermore, the sealing layer can be formed hydrophobic.

The layer system can have a total thickness of at least 300 µm. In particular, the layer system can have a total thickness of at least 400 µm. Furthermore, the layer system can have a total thickness of maximally 600 µm.

The invention further relates to a bearing component having a surface region that includes the corrosion-protecting layer system.

The surface region is preferably not blasted. The manufacturing expense can thereby be reduced and the risk of damage, by abrasive particles, of a bearing manufactured with the bearing component can be reduced.

The bearing component can be formed as a bearing ring, in particular as an inner ring or an outer ring, in particular of a rolling-element bearing or of a sliding bearing.

In addition, the invention relates to a bearing having the inventive bearing component. The bearing can be formed as a large bearing. In particular, the bearing can be formed as a component of a wind turbine.

Furthermore, the invention relates to a method for protecting a bearing component against corrosion. In the inventive method, a first varnish based on polyurethane, to which zinc and vinylphosphonic acid or silane have been added, is applied to a surface region of the bearing component to form a base layer. Subsequently, a second varnish based on polyurethane, to which zinc is added, is applied onto the base layer to form an intermediate layer. Thereafter, a third varnish based on polyurethane, to which micaceous iron oxide has been added, is applied onto the intermediate layer to form a top layer. Finally, a fourth varnish based on polyurethane is applied onto the top layer to form a sealing layer.

The first, second, third, and fourth varnish can be applied using a paint roller or can be sprayed-on.

The second varnish, for forming the intermediate layer, and/or the third varnish, for forming the top layer, can be applied in a plurality of partial layers.

A reactively-crosslinking, one-component varnish can be used as the first varnish, as the second varnish, as the third varnish, and as the fourth varnish. Herein, a reactively crosslinking varnish is understood as being one, whose first reaction component is contained in the varnish and whose second reaction component is available in the environment of the varnish application. The term "one-component varnish" has thus been chosen with regard to the number of components contained in the varnish and not with regard to the total number of components participating in the reaction. Such a varnish can be processed with very little effort and without risk of mixing error. The second reaction component can be water vapor, for example.

A moisture-curing varnish can be used as the first varnish, as the second varnish, as the third varnish, and as the fourth varnish. This has the advantage that the progression of the curing process can be estimated very easily for a known humidity.

The first varnish and/or the second varnish and/or the third varnish and/or the fourth varnish can be applied using a roller.

The invention will be explained below with reference to the exemplary embodiment depicted in the drawing.

BRIEF DESCRIPTION OF THE DRAWING

FIG. 1 shows a schematic depiction of an exemplary embodiment of a coated bearing component 1 according to the present teaching. The depiction is greatly simplified and not to scale, and only shows a section of the bearing component 1.

DETAILED DESCRIPTION OF EMBODIMENTS OF THE PRESENT INVENTION

A bearing component 1 according to the present teachings can be, for example, a bearing ring of a rolling-element-bearing, a sliding-bearing, etc. In particular, the bearing component 1 may be formed as a component of a large bearing of a wind turbine or of another large machine. The bearing component 1 can be manufactured from steel, in particular from rolling-element bearing steel.

A base layer 3 is applied to a surface region 2 of the bearing component 1. The surface region 2 can extend over the entire surface of the bearing component 1 except for the raceways and slipways that are not depicted in the FIGURE, or only over a partial region of the bearing component 1. The base layer 3 contains polyurethane, zinc and vinylphosphonic acid.

In the alternative to vinylphosphonic acid, the base layer 3 can contain a silane, in particular trimethoxysilane. The vinylphosphonic acid and the silane act as adhesion promoters or adhesion strengtheners. The silane forms molecular bridges between organic polymers such as, for example, polyurethane, and inorganic substrates such as, for example, steel. The vinylphosphonic acid attaches itself to inorganic surfaces such as, for example, to steel and thereby offers a better binding of organic polymers such as, for example, polyurethane. In total, the base layer 3 can contain 20 to 40 vol % binder. The indications of quantity here and in the following respectively refer to the cured layer. The zinc content can be, for example, approximately 60 to 90 vol %. Further particulate additives are contained in the base layer 3 at most in small quantities. The base layer 3 preferably contains no further particulate additives.

The base layer 3 can have a thickness of 50 μm. The preferred range of the layer thickness falls between 40 μm and 80 μm. If the layer thickness is chosen too small, there is not sufficient adhesion promotion.

An intermediate layer 4 is disposed on the base layer 3. The intermediate layer 4 contains polyurethane and zinc. The same polyurethane system as in the base layer 3 can be used in the intermediate layer 4. The zinc content can also be chosen analogously to the base layer 3 or somewhat higher, wherein however the range from approximately 60 to 90 vol % is maintained. With increased zinc content, the binder content is reduced accordingly. Further particulate additives, in addition to zinc, are contained in the intermediate layer 4 at most in small quantities. The intermediate layer 4 preferably contains no further particulate additives. The intermediate layer 4 can be comprised of a plurality of partial layers. In the depicted exemplary embodiment, the intermediate layer 4 is comprised of three partial layers. Each partial layer can have a thickness of approximately 40 μm to 80 μm. Thus, in the depicted exemplary embodiment, a thickness of the intermediate layer 4 of approximately 120 μm to approximately 240 μm results. The thickness of the intermediate layer 4 is typically approximately 195 μm. The intermediate layer 4 is thus significantly thicker than the base layer 3.

A top layer 5 is disposed on the intermediate layer 4. The top layer 5 can include polyurethane and micaceous iron oxide. The same polyurethane system as in the base layer 3 can be used in the top layer 5. The micaceous iron oxide content can be approximately 60 to 90 vol %. The binder content can be up to at most 40 vol %. Further particulate additives, in addition to micaceous iron oxide, are contained in the top layer 5 at most in small quantities. The top layer 5 preferably contains no further particulate additives. The top layer 5 can be comprised of a plurality of partial layers. In the depicted exemplary embodiment, the top layer 5 is comprised of two partial layers. Each partial layer can have thickness of approximately 60 μm to 90 μm. Thus, in the depicted exemplary embodiment, a thickness of the top layer 5 of approximately 120 μm to approximately 180 μm results. The thickness of the top layer 5 is typically approximately 160 μm.

A sealing layer 6 made from polyurethane is disposed on the top layer 5. The same polyurethane system as in the base layer 3 can be used in the sealing layer 6. Pigments or other particulate additives are also present in the sealing layer 6 at most in small amounts, in particular with a content of in total less than 10 vol %. The sealing layer 6 preferably contains no pigments or other particulate additives. Accordingly the binder content can be up to 100 vol %. The sealing layer 6 can have a thickness of approximately 30 μm to approximately 70 μm, preferably 40 μm to 60 μm. The thickness of the sealing layer 6 is typically approximately 50 μm.

As can be understood from the above embodiments, the individual layers also differ in particular with respect to the binder content. The binder acts as an adhesive and ensures the internal cohesion of the layers and the adhesion of the layers to the particular substrate. A high binder content tends to result in a high cohesion and a good adhesion. A low binder content tends to result in a low cohesion and a less-good adhesion. On the other hand, however, a high binder content allows only a correspondingly low content of functional particles such as zinc or micaceous iron oxide, so that the properties of these particles are effective only to a limited degree or not at all.

From this interplay, the comparatively high binder content of the base layer 3 results, since a good adhesion to the bearing component 2 is important for the base layer 3. The intermediate layer 4 can have a lower binder content than the base layer 3, since it is applied to the base layer and therefore finds more favorable conditions from the outset for the adhesion than the base layer 3. Accordingly, more zinc is present in the intermediate layer 4 than in the base layer 3. In the top layer 5, a sufficiently high content of micaceous iron oxide is important in order to form a thickest-possible layer with the micaceous iron oxide-platelets. Accordingly, the binder content in the top layer 5 is reduced. The sealing layer 6 should have a high cohesion and a high elasticity in order to form a reliable and durable protection. This correlates with a high binder content and an at most small content of additives such as pigments, which would reduce the elasticity of the sealing layer 6.

The layer system depicted in FIG. 1 represents a very effective corrosion protection. Ground and unblasted surfaces can thus reach level "C5MH" according to DIN EN ISO 12944-2:2000. It is the most difficult requirement class for varnish systems in the air, wherein the individual symbols of the identifier have the following meaning: The letter C indicates that it is concerns atmospheric environmental conditions, i.e., not submerged and not in the soil. The numeral 5 denotes the highest atmospheric corrosiveness class. The following letter M indicates that it is concerns the highest atmospheric corrosiveness class under maritime conditions, i.e., coastal- and offshore-areas with a high salt level. In this class, there are in turn the subdivisions L, M, H depending on the number of years in which the varnish will withstand under the specified environmental conditions. The letter H here denotes the highest class (H=high) with a term of protection greater than 15 years.

In order to comply with such extreme requirements, varnish systems must usually be applied with high thickness (very thickly). However, this high thickness leads to secondary problems such as loss of adhesion (peeling), embrittlement, or crack formation. Despite sandblasting pretreatment, in particular the connection of the base layer 3 to the metallic substrate is often overstrained by a high (too thickly) applied layer thickness and its internal stresses. However, too-low (too thinly applied) layer thicknesses are not sufficiently diffusion-impermeable.

A very large requirement difference lies between achieving, for example, C4 classes or C5L (2 to 5 years) and the highest class C5H (>15 years).

The layer system described herein achieves C5-M-H even on ground, unblasted steel surfaces. Thus, this is a hitherto unusual result.

This result is due, on the one hand, to a very high adhesion effect and stress-equalizing capability of the base layer 3. The sacrificial-anode intermediate layer 4, the top layer 5, which protects the intermediate layer 4, and the sealing layer 6, which seals the top layer 5 also provide important contributions to achieving this result.

Specifically, the extremely good corrosion protection of the inventive layer system arises in the following manner.

The sealing layer 6, which is formed very smooth and hydrophobic, shields against any environmental influence and produces diffusion-impermeability. In case this barrier breaks down, the top layer 5 acts as a further barrier. The top layer 5 includes a micaceous-iron-oxide system formed in an armor-like manner by overlapping plates, which in particular is also very mechanically stable due to the high hardness of the micaceous iron oxide. In addition, a high diffusion-impermeability is achieved by the platelet-like shape of the micaceous iron oxide, so that scarcely any water vapor can penetrate up to the intermediate layer 4 and in particular to the zinc particles contained therein. The anodic protective effect of the zinc in the intermediate layer 4 only comes to bear after these additional barriers break down, i.e., the zinc is only even used in a very late stage; the prior barriers are based on a shielding against damaging environmental influences. The base layer 3 provides for an extremely good adhesion of the layer system to the surface of the bearing component 1 and for a de-bonding- and peeling-prevention. In addition, the base layer 3 has a high load capacity and elasticity.

Due to the special composition and the combination of individual layers, the inventive layer system has a rather below-average total thickness in proportion to the high classification and has high performance reserves even with partial damage and mechanical or chemical influence.

To form the layer system depicted in FIG. 1 or a similar one, it can take place in the following manner:

The bearing component 1, whose surface is typically ground, is cleaned and thereby activated in the surface region 2, in which the coating should take place. This can be effected, for example, by a treatment initially with denatured ethanol and then with acetone. In particular, an activation to a surface energy of over 72 mN/m should occur. Neither before nor after the activation is the bearing component 1 blasted with abrasive particles and thereby roughened. Unlike, for example, an epoxy resin varnish, polyurethane with increased binder content adheres very well even to unblasted steel surfaces in case the layer thickness is suitably selected. In an adhesion strength test according to DIN EN ISO 4624, the pull-off value on a ground, not-blasted steel surface is typically 17-20 MPa, wherein the break during pull-off occurs within the coating.

The base layer 3 is formed by a varnish application, for example using a paint roller, on the activated surface region 2. For this purpose, a moisture-curing, one-component varnish based on polyurethane is mixed beforehand with zinc particles and vinylphosphonic acid or silane. Such a varnish is easily and uniformly apply-able, fast-drying, highly adhesive, and chemically and mechanically stable as well as minimally compressible due to the fillers despite its elasticity. The thickness of the varnish application is selected to be approximately 40% greater than the final desired layer thickness, since its thickness decreases accordingly with the drying and curing of the applied varnish layer. This also applies to the forming of the further layers described in the following.

The one-component varnish can have the following composition:

The varnish contains a solvent content (e.g., naphtha) of 20 vol % to 40 vol %, in particular 30 vol %.

After subtraction of the solvent content, the remaining dry content is composed as follows, wherein the total dry content is taken as the reference value for the percentages:

20-40 vol %, in particular 30 vol %, one-component, moisture-curing polyurethane (based on aromatic polyisocyanate), 50-90 vol % zinc, up to 10 vol % additive (solid or liquid); thereof, for example, 0.5-4 vol % silane or 0.5-4 vol % vinylphosphonic acid.

The addition of vinylphosphonic acid or silane is required in order to sufficiently raise the adhesion strength and elasticity of the base layer 3 so that overall a very sturdy layer system is possible. In the alternative to the application with the paint roller, there is the possibility to carry out a varnishing with a spray gun. Instead of the one-component varnish, a two-component varnish based on polyurethane can be used. This also applies to the forming of the further layers described in the following. Typically, either a one-component varnish is used for all layers or a two-component varnish is used for all layers.

The base layer 3 is applied in a single operation and thus has only a partial layer. The curing of the varnish is effected by a crosslinking of functional ends (isocyanate) of the polyurethane system.

After sufficient venting, during which a large part of the carbon dioxide formed in the curing reaction escapes from the base layer 3, the intermediate layer 4 is formed on the base layer 3. The varnish application required therefor can in turn be effected by paint roller or by spray gun. A moisture-curing, one-component varnish based on polyurethane, to which zinc particles are added, can be used as the varnish. Essentially the same varnish composition can be used as for the forming of the base layer 3. Only the zinc content can be selected to be somewhat higher in comparison; however it again falls in the range of 50-90 vol %. Analogous to the base layer 3, a two-component varnish based on polyurethane can also be used for the intermediate layer 4.

The intermediate layer 4 can be applied in a plurality of operations. In particular, the intermediate layer 4 can be formed from three partial layers, wherein prior to each application of the next partial layer a sufficient venting is ensured in order to prevent bubble formation. Due to the application of a plurality of partial layers, the curing is improved when the intermediate layer 4 is applied in comparison to the forming of the intermediate layer 4 in a single operation. In addition, the pore-penetrability is reduced, and the internal stresses, which in the extreme case can lead to a delamination, are reduced. This is due in particular to the fact that solvent and carbon dioxide generated during curing of the partial layers can escape better from a thin layer application than from a thick layer application. With use of a one-component varnish based on polyurethane, water vapor for the crosslinking can also diffuse inward more easily.

The top layer 5 is next applied to the uppermost layer of the intermediate layer 4. It is also initially waited here until the intermediate layer 4 is sufficiently vented. Micaceous iron oxide in platelet form, instead of zinc, is mixed into the varnish provided for the top layer 5. Here the identical varnish—however without zinc—can be used as the starting material for the top layer 5 as in the manufacture of the intermediate layer 4, i.e., the varnishes can be formed identically with respect to their polyurethane base. This guarantees a good compatibility of the top layer 5 with the intermediate layer 4 and avoids unwanted reactions that could lead to damage of the top layer 5 or the intermediate layer 4. In particular, a varnish composition analogous to the base layer 3 can be chosen that contains micaceous iron oxide instead of zinc. Accordingly, the varnish can contain 60-90 vol % micaceous iron oxide in dry content. The top layer 5 can be applied, for example, with the paint roller or the spray gun.

The top layer 5 is applied in a plurality of operations in an analogous manner as described for the intermediate layer 4, i.e., a plurality of partial layers are formed. In particular, two partial layers are formed wherein sufficient venting of the first partial layer is ensured prior to the forming of the second partial layer.

Finally the sealing layer 6 is applied to the top layer 5, wherein a sufficient venting of the top layer 5 is also waited for (permitted) here. The application can again be effected by paint roller or by spray gun. A moisture-curing, one-component varnish based on polyurethane can be used as the varnish, which contains only a small content of pigments or other particles, or no pigments or other particles.

The sealing layer 6 is formed in one operation and thus includes only one partial layer.

After the curing of all layers, the layer system protects the bearing component 1 against corrosion very effectively and over a decades-long time period.

If all layers are based on the same polyurethane base, embrittlements that can arise due to diffusion of varnish components into the respective adjacent layer, and stresses that can lead to a lifting and spalling of layers, are avoided in a particularly reliable manner.

REFERENCE NUMBERS

1 Bearing component
2 Surface region
3 Base layer
4 Intermediate layer
5 Top layer
6 Sealing layer

The invention claimed is:

1. A method for protecting a bearing component against corrosion, comprising:
applying and curing a first varnish based on polyurethane into which a first quantity of zinc particles have been mixed and into which either vinylphosphonic acid or silane has been mixed, to form a base layer on a surface region of the bearing component, applying and curing a second varnish based on polyurethane, to which a second quantity of zinc particles have been added, to form an intermediate layer on the base layer,
applying and curing a third varnish based on polyurethane, to which micaceous iron oxide has been added, to form a top layer on the intermediate layer, and
applying and curing a fourth varnish based on polyurethane to form a sealing layer on the top layer, wherein, to form the intermediate layer, the second varnish is applied in a plurality of partial layers, and/or to form the top layer, the third varnish is applied in a plurality of partial layers.

2. A coating that protects against corrosion, comprising:
a base layer formed by curing a first mixture containing polyurethane, a first quantity of zinc particles, and at least one adhesion promoter selected from the group consisting of a vinylphosphonic acid and a silane,
an intermediate layer adhered to the base layer, the intermediate layer being formed by applying a second mixture containing polyurethane and a second quantity of zinc particles to the cured base layer and then curing the intermediate layer,
a top layer adhered to the intermediate layer, the top layer being formed by applying a third mixture containing polyurethane and micaceous iron oxide to the cured intermediate layer and then curing the top layer, and
a sealing layer adhered to the top layer, the sealing layer being formed by applying a fourth mixture containing polyurethane to the cured top layer and then curing the sealing layer,
wherein the intermediate layer and/or the top layer are formed from a plurality of partial layers.

3. The method according to claim 1, wherein a reactively-crosslinking, one-component varnish is used as the first varnish, as the second varnish, as the third varnish, and as the fourth varnish.

4. The method according to claim 1, wherein the fourth varnish contains no pigments or particulate additives.

5. The method according to claim 1,
wherein the first quantity of zinc particles comprises 60-90 vol % of the base layer.

6. A bearing ring formed of steel having the coating according to claim 2 adhered to at least one steel surface of the bearing ring.

7. The coating according to claim 2, wherein the adhesion promotor is the silane.

8. A bearing component having the coating according to claim 2 formed on at least one surface region of the bearing component which surface region is not abrasively blasted.

9. A bearing having the bearing component according to claim 8.

10. A bearing ring formed of steel having the coating according to claim 2 adhered to at least one steel surface of the bearing ring.

11. The coating according to claim 2, wherein the adhesion promotor is the vinylphosphonic acid.

12. The coating according to claim 2, wherein the sealing layer contains no pigments or particulate additives.

13. The coating according to claim 2,
wherein the first quantity of zinc particles comprises 60-90 vol % of the base layer.

14. The coating according to claim 2,
wherein a thickness of the coating is at least 300 μm.

15. The coating according to claim 2,
wherein a thickness of the coating is about 400 μm.

16. The coating according to claim 2,
wherein a thickness of the coating is no more than 600 μm.

* * * * *